(12) United States Patent
Singh et al.

(10) Patent No.: US 12,092,171 B2
(45) Date of Patent: Sep. 17, 2024

(54) ROTARY COUPLING WITH MAGNETIC PRELOAD

(71) Applicant: Waters Technologies Corporation, Milford, MA (US)

(72) Inventors: Gurpreet Singh, Providence, RI (US); Colin F. Fredette, Carlisle, MA (US); Dan Sullivan, Shrewsbury, MA (US); Neal Pugh, Taunton, MA (US)

(73) Assignee: Waters Technologies Corporation, Milford, MA (US)

( * ) Notice: Subject to any disclaimer, the term of this patent is extended or adjusted under 35 U.S.C. 154(b) by 35 days.

(21) Appl. No.: 17/902,397

(22) Filed: Sep. 2, 2022

(65) Prior Publication Data
US 2023/0086836 A1 Mar. 23, 2023

Related U.S. Application Data

(60) Provisional application No. 63/247,109, filed on Sep. 22, 2021.

(51) Int. Cl.
*F16D 3/60* (2006.01)
*F16H 21/40* (2006.01)

(52) U.S. Cl.
CPC .............. *F16D 3/60* (2013.01); *F16H 21/40* (2013.01); *F16D 2300/00* (2013.01)

(58) Field of Classification Search
CPC ......... F16D 3/60; F16D 2300/00; F16H 21/40
(Continued)

(56) References Cited

U.S. PATENT DOCUMENTS

| 5,330,388 A | 7/1994 | Blanding |
| 6,244,122 B1 | 6/2001 | Hsu et al. |

(Continued)

FOREIGN PATENT DOCUMENTS

| DE | 102011004069 A1 | 8/2012 |
| EP | 1968176 A1 | 9/2008 |

(Continued)

OTHER PUBLICATIONS

International Search Report and Written Opinion in PCT/US2022/042502 mailed on May 3, 2023.
(Continued)

*Primary Examiner* — T. Scott Fix
(74) *Attorney, Agent, or Firm* — Schmeiser, Olsen & Watts LLP; William G. Guerin

(57) ABSTRACT

Described is a rotary coupling that includes a pair of coupling bodies having parallel (preferably coincident) rotation axes, two cylindrical elements and a preload mechanism. A gap is provided between surfaces on the first and second coupling bodies. The first cylindrical element is disposed on the first coupling body and has a first cylinder axis, and the second cylindrical element is disposed on the second coupling body adjacent to the first cylindrical element and has a second cylinder axis that is perpendicular to the first cylinder axis. The preload mechanism imparts a force to each of the first and second coupling bodies and thereby preloads the first and second cylindrical elements against each other at a point of contact. One example of the preload mechanism includes a pair of magnets disposed opposite each other across the gap and another example of the preload mechanism includes an air bearing.

20 Claims, 6 Drawing Sheets

(58) Field of Classification Search
USPC .............................................. 74/89
See application file for complete search history.

(56) References Cited

U.S. PATENT DOCUMENTS

| | | |
|---|---|---|
| 9,531,248 B2 | 12/2016 | Kubo et al. |
| 2009/0114047 A1 | 5/2009 | Davenne et al. |
| 2018/0138796 A1 | 5/2018 | Yamashita |

FOREIGN PATENT DOCUMENTS

| | | |
|---|---|---|
| EP | 2213566 A1 | 8/2010 |
| FR | 2248740 A5 | 5/1975 |
| SU | 872838 A1 | 10/1981 |

OTHER PUBLICATIONS

International Preliminary Report on Patentability in PCT/US2022/042502 mailed on Apr. 4, 2024.

ROTARY COUPLING WITH MAGNETIC PRELOAD

RELATED APPLICATION

This application claims the benefit of the earlier filing date of U.S. Provisional Patent Application Ser. No. 63/247,109 filed Sep. 22, 2021 and titled "Rotary Coupling with Magnetic Preload" the entirety of which is incorporated herein by reference.

FIELD OF THE INVENTION

The disclosed technology relates generally to a transfer of rotary motion. More particularly, the technology relates to a rotary coupling mechanism that transfers the desired rotary motion to a motion stage and suppresses the transfer of non-desired error motions

BACKGROUND

Various types of motors/actuators may be used to achieve a rotary motion of a rotary stage. The motor and rotary stage may be rigidly bound to each other without compliance. In such instances, error motions imparted by the motor are directly transmitted to the rotary stage. These error motions include small linear displacements and angular motions about axes orthogonal to the rotation axis of the rotary stage.

The rotary stage may hold a component that is sensitive to one or more of the error motions. For example, the rotary stage may hold a diffraction grating used to tune the wavelength of an incident optical beam in an optical system. Undesired motion of the diffraction grating can lead to degradation in the performance of the optical system. A rotary shaft that is rigidly attached to the motor can exhibit pushing and/or pulling. In addition, a component secured to the rotary stage may be sensitive to heat. Conventional rotary couplings can allow an easy path for heat to be readily transferred from the motor to the rotary stage and component.

SUMMARY

In one aspect, a rotary coupling includes first and second coupling bodies, first and second cylindrical elements and first and second magnets. The first coupling body has a first rotation axis. The second coupling body is disposed adjacent to the first coupling body and has a second rotation axis that is parallel to the first rotation axis. A gap is present between a first surface on the first coupling body and a second surface on the second coupling body. The first cylindrical element is disposed on the first coupling body and has a first cylinder axis, and the second cylindrical element is disposed on the second coupling body and is adjacent to the first cylindrical element. The second cylindrical element has a second cylinder axis that is perpendicular to the first cylinder axis. The first magnet is disposed on the first coupling body and has a pole disposed at the gap. The second magnet is disposed on the second coupling body and has a pole disposed across the gap from the pole of the first magnet. The poles of the first and second magnets disposed at the gap have a same magnetic polarity such that a repulsive magnetic force is imparted on each of the first and second coupling bodies to thereby preload the first and second cylindrical elements against each other at a point of contact.

The first cylinder axis may be parallel to the first and second rotation axes and the second rotation axis may be coincident with the first rotation axis.

A position of one of the first and second magnets may be adjustable to control a separation between the first and second magnets and thereby adjust the magnitude of the repulsive magnetic force. The first coupling body may include a screw to adjust a position of the first magnet with respect to the second magnet.

The rotary coupling may further include first and second rotary shafts. The first rotary shaft is secured to the first coupling body and has a first shaft axis that is coincident with the first rotation axis and the second rotary shaft is secured to the second coupling body and has a second shaft axis that is coincident with the second rotation axis. The first coupling body and the first rotary shaft may be formed as a single body and the second coupling body and the second rotary shaft may be formed as a single body. The first and second coupling bodies may include a hub portion secured to the first rotary shaft and the second rotary shaft, respectively.

The first cylindrical element may include a first bearing having a rotation axis coincident with the first cylinder axis and the second cylindrical element may include a second bearing having a rotation axis coincident with the second cylinder axis.

The rotary coupling may include a rotary motor coupled to the first rotary shaft and may include a diffraction grating coupled to the second rotary shaft.

In another aspect, a rotary coupling includes first and second coupling bodies, first and second cylindrical elements and a preload mechanism. The first coupling body has a first rotation axis. The second coupling body is disposed adjacent to the first coupling body and has a second rotation axis that is parallel to the first rotation axis. A gap is present between a first surface on the first coupling body and a second surface on the second coupling body. The first cylindrical element is disposed on the first coupling body and has a first cylinder axis. The second cylindrical element is disposed on the second coupling body and is adjacent to the first cylindrical element. The second cylindrical element has a second cylinder axis that is perpendicular to the first cylinder axis. The preload mechanism is disposed on at least one of the first and second coupling bodies to impart a force to each of the first and second coupling bodies and thereby preload the first and second cylindrical elements against each other at a point of contact.

The preload mechanism may include a first magnet disposed on the first coupling body and having a pole disposed at the gap and a second magnet disposed on the second coupling body and having a pole disposed across the gap from the pole of the first magnet. The poles of the first and second magnets are disposed at the gap and have a same magnetic polarity such that a repulsive magnetic force is imparted on each of the first and second coupling bodies to thereby preload the first and second cylindrical elements against each other at the point of contact.

The preload mechanism may include an air bearing that provides a flow of gas directed against at least one of the first and second coupling bodies to preload the first and second cylindrical elements against each other at the point of contact.

The second rotation axis may be coincident with the first rotation axis.

The first cylindrical element may include a first bearing having a rotation axis coincident with the first cylinder axis and the second cylindrical element may include a second bearing having a rotation axis coincident with the second cylinder axis.

The rotary coupling may further include first and second rotary shafts. The first rotary shaft is secured to the first coupling body and has a first shaft axis that is coincident with the first rotation axis. The second rotary shaft is secured to the second coupling body and has a second shaft axis that is coincident with the second rotation axis.

The rotary coupling may include a rotary motor coupled to the first rotary shaft and may include a diffraction grating coupled to the second rotary shaft.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

Figure 1:
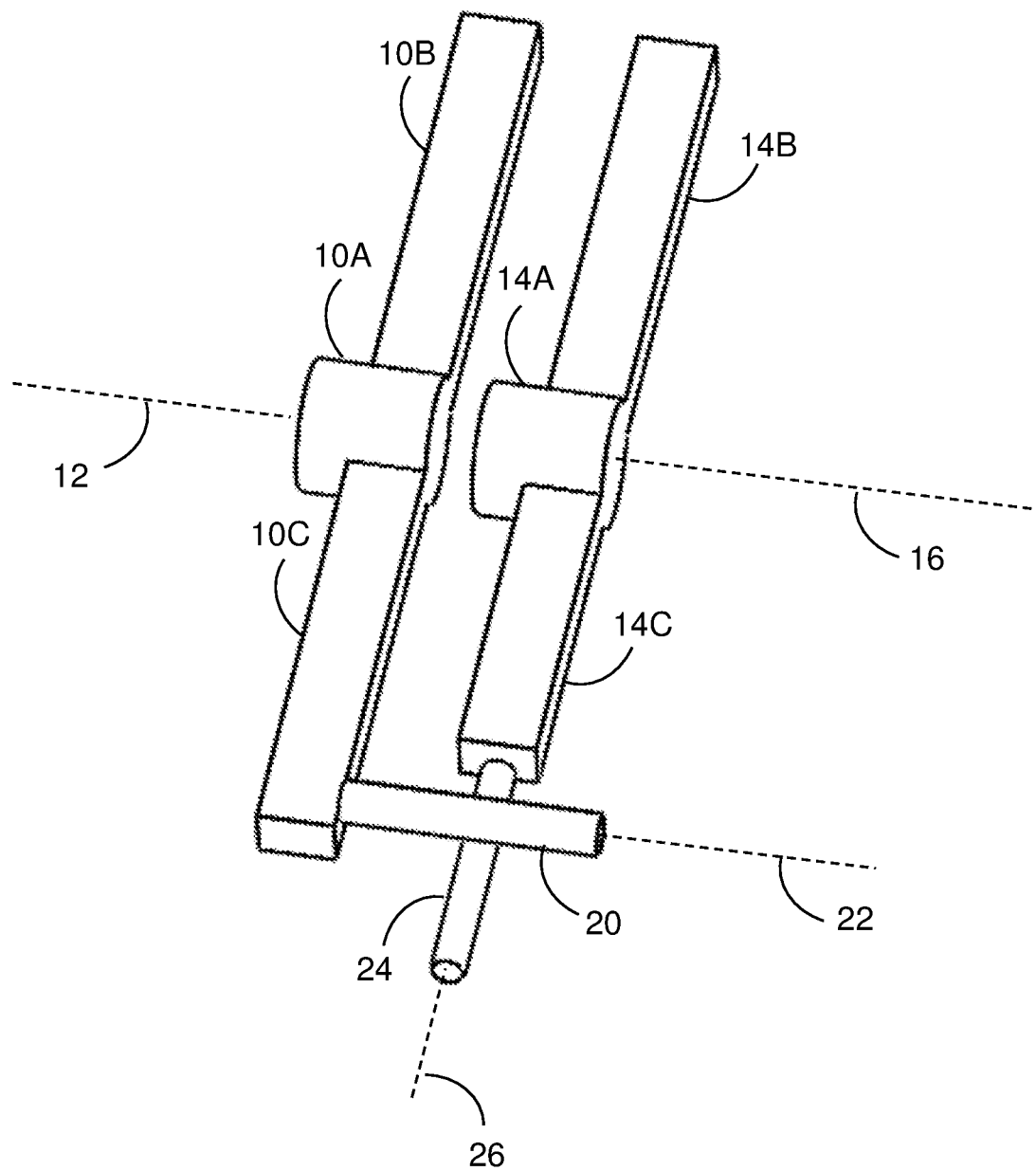
FIG. 1 depicts a portion of a simplified example of a rotary coupling.

Reference in the specification to an embodiment or example means that a particular feature, structure or characteristic described in connection with the embodiment or example is included in at least one embodiment or example of the teaching. References to a particular embodiment or example within the specification do not necessarily all refer to the same embodiment or example.

The present teaching will now be described in detail with reference to exemplary embodiments or examples thereof as shown in the accompanying drawings. While the present teaching is described in conjunction with various embodiments and examples, it is not intended that the present teaching be limited to such embodiments and examples. On the contrary, the present teaching encompasses various alternatives, modifications, and equivalents, as will be appreciated by those of skill in the art. Those of ordinary skill having access to the teaching herein will recognize additional implementations, modifications, and embodiments, as well as other fields of use, which are within the scope of the present disclosure as described herein.

In brief overview, embodiments and examples disclosed herein are directed to a rotary coupling. Examples of such rotary couplings described herein are based on the idea that when two cylinders having orthogonal cylinder axes are pushed against each other, the cylinders are in contact at a single point. Other than frictional forces, only forces that are normal to the cylinder surfaces at the contact point are transmitted from one cylinder to the other cylinder. Each cylinder is attached to a coupling body that is physically separate from the coupling body for the other cylinder. Each coupling body is attached to a rotary shaft and the two rotary shafts are independent and have parallel shaft axes. In preferred embodiments the shaft axes are coincident. The two coupling bodies are preloaded such that the first and second cylindrical elements are biased against each other at a single point of contact.

In one example, each of the two coupling bodies has a magnet that is adjacent to the other magnet across a gap between the coupling bodies. The magnets are oriented such that the poles at the gap are the same polarity, therefore the magnets exert a repulsive force on each another causing the coupling bodies to maintain contact between the two cylindrical elements at the single point. The magnitude of the preload that maintains the cylinders in contact is adjustable, i.e., "tunable," by selecting magnets that provide the desired magnetic field strength. Alternatively, or in combination, the magnitude of the preload force may be tuned by adjusting the separation distance between the magnets. This preload force is selected such that at designed acceleration two orthogonal cylinders maintain mechanical contact in both clockwise and anti-clockwise directions of motion.

In an alternative example, the preload mechanism applies a pneumatic preload such that the two coupling bodies maintain contact between the two cylindrical elements at the single point. The pneumatic preload mechanism may include an air bearing that directs a flow of gas against at least one of the coupling bodies to maintain the contact between the two cylindrical elements. The preload force (repulsive or attractive) can also be provided pneumatically by impinging a jet of pressurized air on a flat plane. These typical pneumatic arrangements are called flapper-nozzle arrangements.

Advantageously, the single point of contact between the motor assembly and the rotary stage allows on a single degree of freedom to be transmitted through the rotary coupling. Consequently, the rotary coupling transmits primarily rotational motion about a single axis while removing unwanted translations (e.g., push and pull translations) and other rotations that may otherwise be transmitted through the rotary coupling. In addition, assembly tolerances can be relaxed, leading to reduced manufacturing and assembly time. Moreover, the rotary coupling allows for substantial thermal expansion and contraction of coupling components so that single point contact is maintained and coupling performance is unaffected. The rotary coupling can accommodate thermal distortion of parts without affecting the rotary stage ability to maintain precision of motion.

Reference is made to FIG. 1 which is a simplified illustration of an example of a rotary coupling having a first coupling body 10A, 10B and 10C (generally 10) and a second coupling body 14A, 14B and 14C (generally 14) disposed adjacent to each other. The first coupling body 10 includes a hub portion 10A and two extensions 10B and 10C. Similarly, the second coupling body 14 has a hub portion 14A and two extensions 14B and 14C. Each coupling body 10 and 14 has a rotation axis 12 and 16, respectively, about which the body is configured to rotate. As illustrated, the rotation axes are coincident. In other embodiments, the rotation axes may be parallel but offset from each other; however, such embodiments may have a reduced angular range, depending on structural dimensions and the separation between the rotation axes.

In the illustrated example, a first cylindrical 20 element extends from near one end of the lower extension 10C along a first cylinder axis 22 that is parallel to the rotation axes 12 and 16. A second cylindrical element 24 extends from the end of the lower extension 14C along a second cylinder axis 26 that is perpendicular to the first cylinder axis 22 and rotation axes 12 and 16. The first and second cylindrical elements 20 and 24 are adjacent and preloaded to be in contact against each other at a single point although the means for preloading are not shown in the figure. If the first coupling body 10 rotates in either direction about rotation axis 12, the second coupling body 14 will rotate in the same direction and at the same rotation rate about rotation axis 16. Absent frictional considerations, the first coupling body 10 can transmit a pure rotational motion to the second coupling body 14 via the single point of contact without imparting any force that can result in a translation or a rotation about axes perpendicular to axes 12 and 16.

Figure 2:
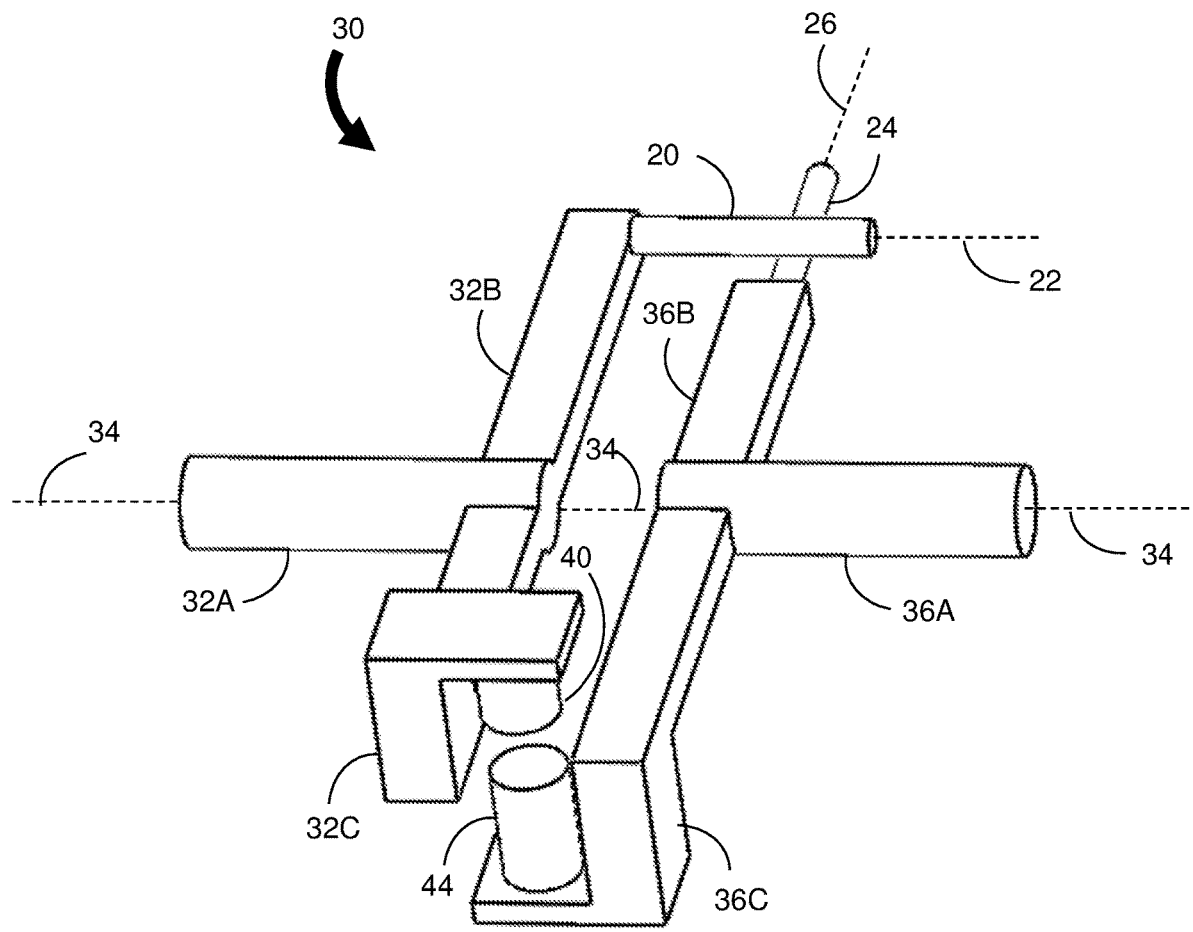
FIG. 2 depicts another example of a rotary coupling and shows rotary shafts are integrated with the coupling bodies and magnets used to provide a preload.

FIG. 2 illustrates an embodiment of a rotary coupling 30 in which rotary shafts are integrated with the structure of the corresponding coupling bodies. The first coupling body 32 includes an integral rotary shaft 32A and two extensions 32B and 32C at the shaft end. Similarly, the second coupling body 36 includes an integral rotary shaft 36A and two extensions 36B and 36C at the shaft end. The two coupling bodies 32 and 36 share a common rotation axis 34. In an alternative embodiment, the coupling bodies 32 and 36 include hub portions in place of rotary shafts. One hub portion is configured to be secured near or at the end of a rotary shaft coupled to a rotary motor and the other hub portion is configured to be secured near or at the end of a second rotary shaft coupled to a rotary stage.

Similar to the description provided above with respect to FIG. 1, rotation of the first coupling body 32 about the common axis 34 results in a rotation of the second coupling body 36 in the same rotation direction and rotation rate.

A pair of magnets 40 and 44 is used to bias (preload) the two cylindrical elements 20 and 24 against each other at a point of contact. One magnet 40 is attached near one end of the extension 32C and the other magnet 44 is attached near the end of the neighboring extension 36C. The ends of the extensions 32C and 36C are shaped so that the attached magnets 40 and 44 are separated by a gap. The magnet poles at the gap are of the same polarity so that the magnets 40 and 44 exert a repulsive magnetic force on each other resulting in the two cylindrical elements 20 and 24 being biased against each other. The magnitude of the repulsive magnetic force should be sufficient to overcome any acceleration of one of the cylindrical elements 20 and 24 from the other during motor acceleration so that the single point contact is maintained. This condition should be satisfied for all operating conditions up to and including the greatest acceleration that may be realized with the rotary motor. Conversely, the repulsive magnetic force between the magnets 40 and 44 should not be so great as to cause the position of the magnets to shift with respect to each other, that is, to become misaligned and therefore fail to provide a sufficient preload.

In some embodiments, the position of at least one of the magnets 40 and 44 is adjustable with respect to the position of the other magnet 44 and 40 to thereby control their separation distance. This adjustability allows the magnitude of the repulsive magnetic force and the resulting preload of the cylindrical elements 20 and 24 against each other to be tuned.

Figure 6:
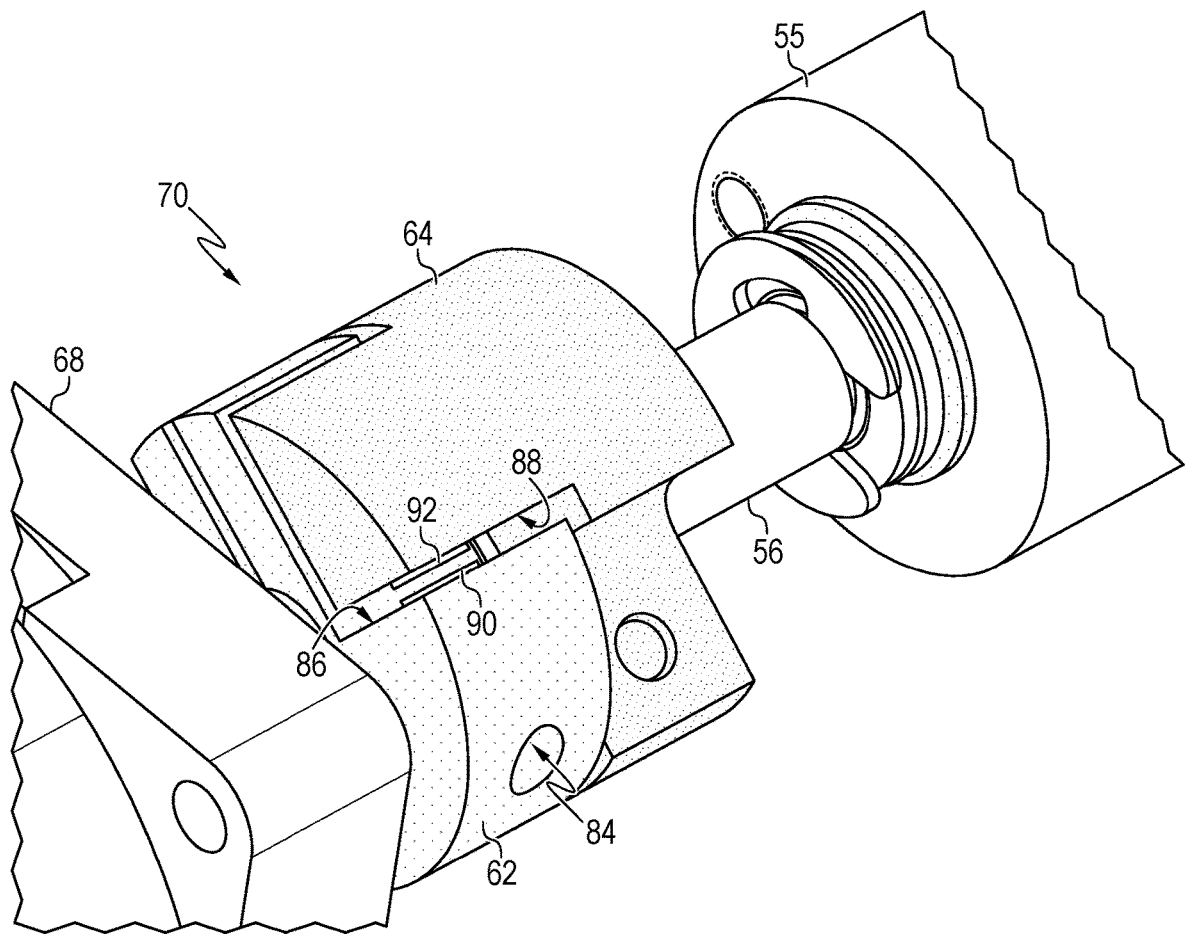
FIG. 6 is a perspective view of the rotary coupling of FIG. 4.

While the examples described above refer to coupling bodies having extensions to which cylindrical elements and magnets are attached, alternative embodiments are not required have structures that extend outward from the rotation axis. More generally, the cylindrical elements and magnets may be disposed on any surface of a coupling body that results in the magnets being separated by a small gap and the cylindrical elements being arranged with respect to each other so that the magnetic force between the magnets biases the cylindrical elements into a point contact. FIG. 6, described in more detail further below, shows an example of a rotary coupling with coupling bodies that do not include extensions but is configured to achieve similar preloading of the cylindrical elements based on the repulsive magnetic force on the two magnets.

Figure 3:
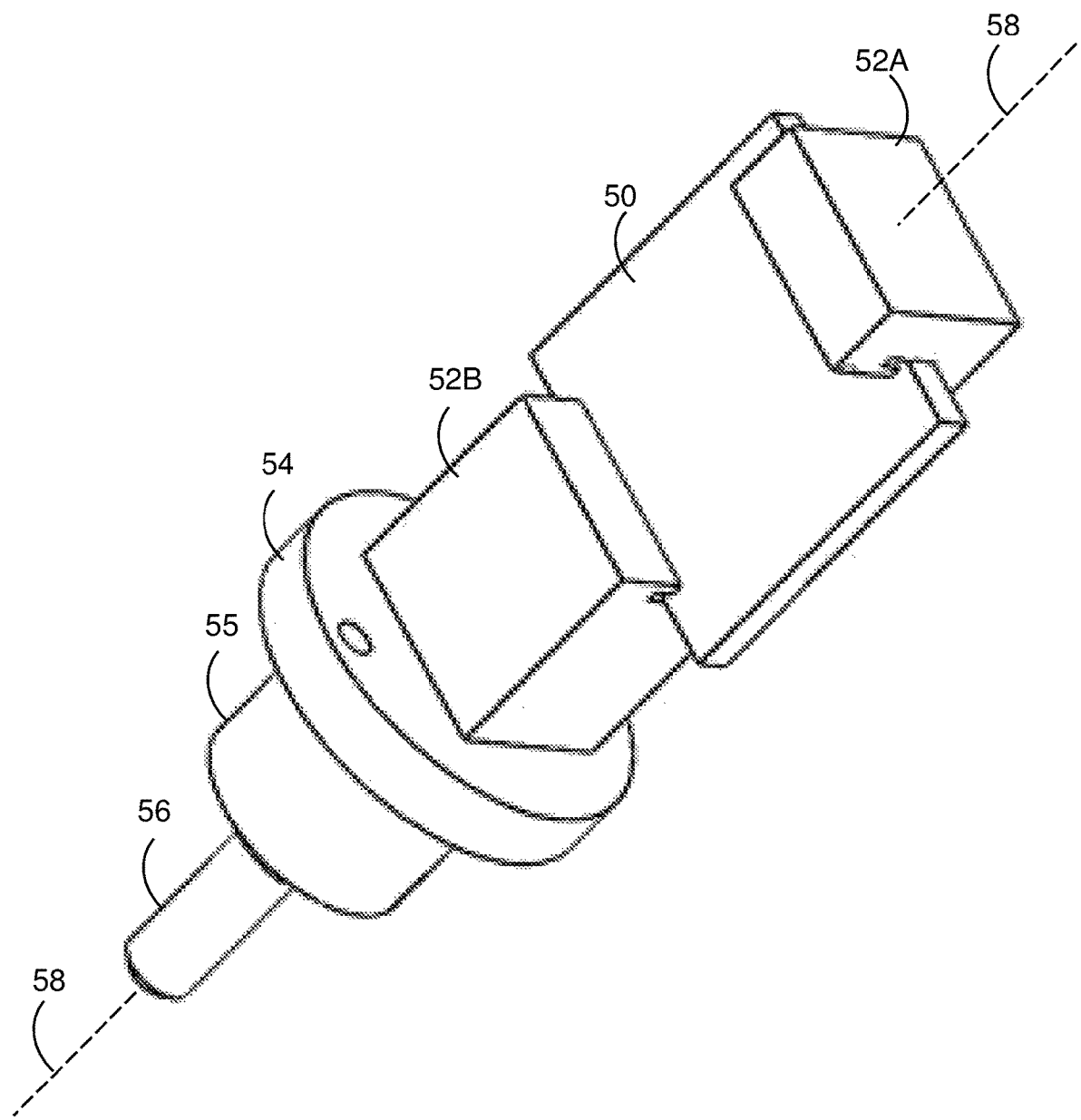
FIG. 3 shows a diffraction grating held in a grating holder at one end of a rotary shaft.

Rotary couplings described herein may be used to control the rotational motion of various types of components. In one example, the rotary coupling is used as part of a rotation stage that includes a diffraction grating. FIG. 3 shows a diffraction grating 50 held in a grating holder 52A and 52B (generally 52) at one end of a rotary shaft 56. The front face of the grating 50 is unobscured by the upper and lower holder portions 52A and 52B, respectively. A housing 54 couples the grating holder 52 to the rotary shaft 56 through a bearing 55. The rotary shaft 56 is coupled to a rotary motor through a rotary coupling and second rotary shaft (not shown) to enable rotation of the front face of the diffraction grating 50 about an axis 58. The bearing 55 and and a preload spring (not visible) are used to better define the axis of rotation of the grating holder 52 with respect to the rotary shaft 56.

In use, an optical beam incident on the diffraction grating 50 is angularly dispersed into its spectral components. Adjusting the rotation angle of the grating 50 allows for selection of light in a desired wavelength range using apertures and other optical components as is known in the art. In one example, the rotation stage and diffraction grating 50 are elements of an ultraviolet (UV) detection module that may be used as part of a liquid chromatography system. For example, a subset of the wavelengths in the optical beam is selected and passed through the chromatographic system flow. Variations in absorbance of the optical beam due to the system flow indicate different sample components in the chromatographic sample separation. Unwanted motion of the diffraction grating 50 can cause errors in the wavelength control. Consequently, the unwanted motion can degrade chromatographic measurement sensitivity and accuracy. Thus, a rotary coupling that mechanically couples the diffraction grating 50 to a rotary motor and can substantially decouple unwanted motion, is extremely beneficial.

Figure 4:
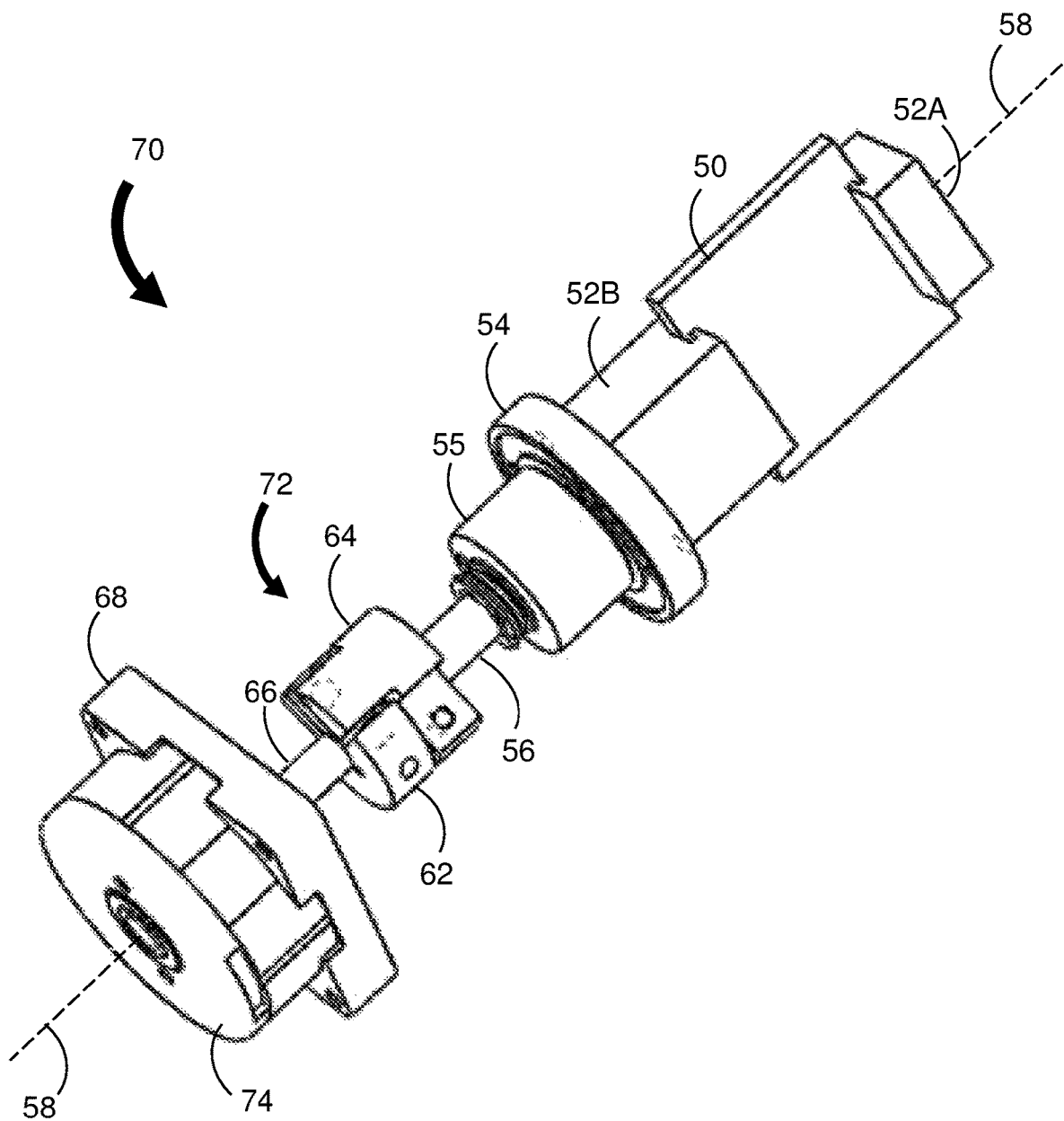
FIG. 4 shows an example of a rotary stage that can be used to control rotational motion of the diffraction grating shown in FIG. 3
Figure 5:
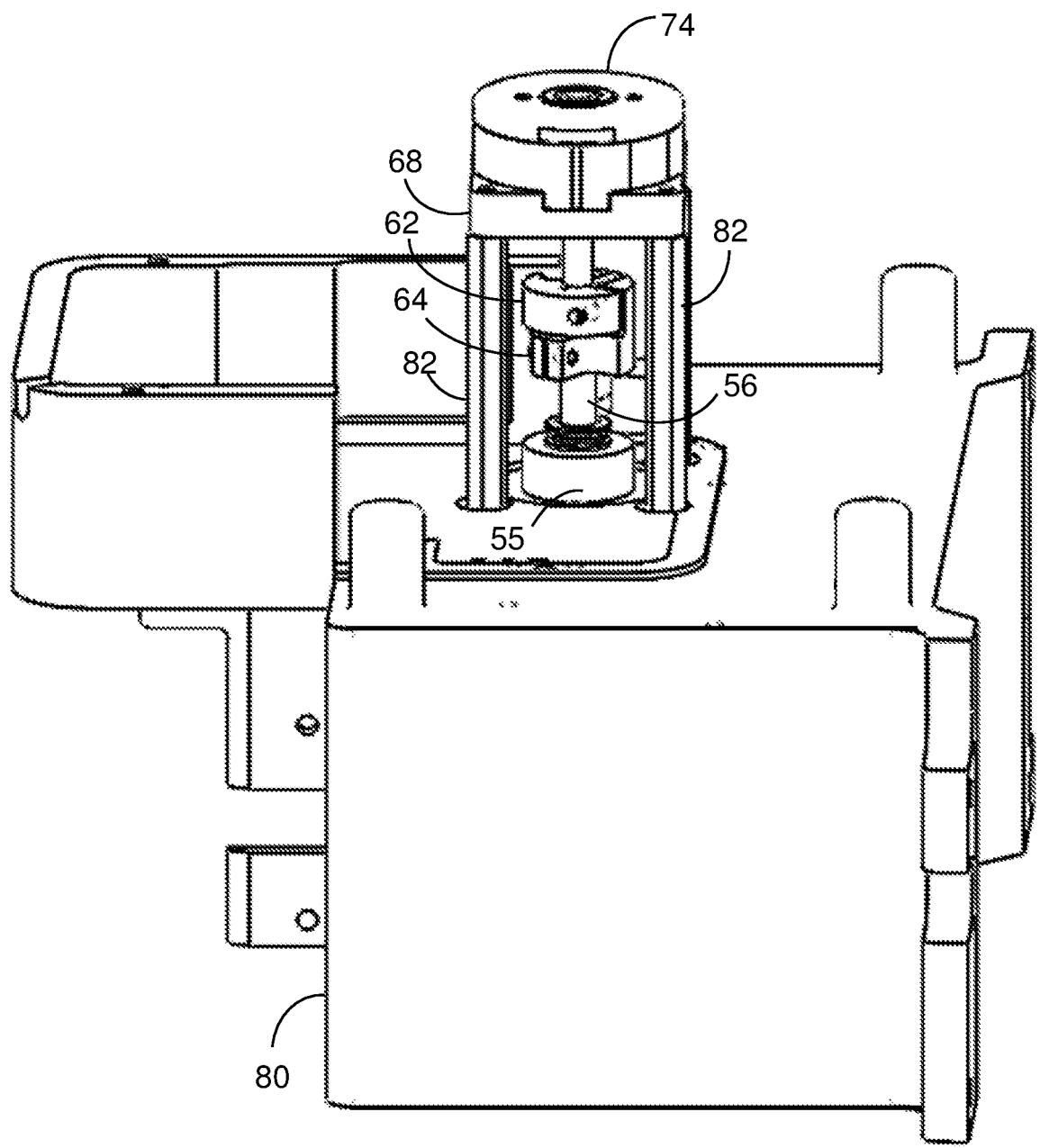
FIG. 5 shows the rotary stage of FIG. 4 secured to a housing of a chromatographic detector module.

FIG. 4 shows a rotary stage 70 having a rotary coupling 72 to couple rotary motion from a rotary motor to the diffraction grating 50 of FIG. 3. The rotary stage includes a rotary motor 74 with a rotary shaft 66 extending from the motor through a mounting plate 68 to a first coupling body 62. By way of example, the rotary motor 74 may be a stepper motor although other types of rotary motors may be used depending on the required angular rotation resolution and accuracy. The rotary shaft 56 that is coupled to the grating holder 56 is secured at its other end to a second coupling body 64. The rotary stage 70 is secured to a housing 80 of a chromatographic detection module as shown in FIG. 5. The rotary motor 74 is supported by the mounting plate 68 which is attached to the housing by standoff elements 82 that thermally isolate the rotary motor 74 from the housing 80.

Referring again to FIG. 4, operation of the chromatographic detection module includes rotation of the diffraction grating 50 about the rotation axis 58. The rotary motor 74 causes a rotation of the rotary shaft 66 and coupling body 62 about the rotation axis 58. This rotational motion is coupled to the opposing coupling body 64 and rotary shaft 56 to achieve the desired rotation of the diffraction grating 50 about the rotation axis 58. During motor operation, the rotary shaft 66 can move up and down. Depending on the quality of the motor and its internal bearing, the range of motion can be less than a micron to 100 microns along the rotation axis 58, causing the location of the point of contact on each cylindrical element of the coupling bodies to slide along the cylinder surfaces. Such translational motion is not transmitted across the rotary coupling 72 and does not change the position of the diffraction grating 50.

FIG. 6 shows a perspective view of the rotary coupling 72 of FIG. 4. The first coupling body 62 is attached at the end of the rotary shaft 66 coupled to the motor 74 and the second coupling body 64 is attached at the end of the rotary shaft 56 coupled to the bearing 55. The coupling bodies 62 and 64 are shaped so that a small gap is present between two surfaces 86 and 88.

The first coupling body 62 has a bore occupied by a magnet 90 so that end of the magnet 90 extends a short distance into the gap. Similarly, the second coupling body 64 has a bore in which a second magnet 92 is disposed so that the end of the second magnet 92 extends into the gap opposite to the first magnet 90. Each magnet 90 or 92 can be slip fit or loosely fit into its bore and is constrained to its position by the magnetic force across the gap if the diameters of the bores are not large with respect to the magnet diameter otherwise, with sufficiently high magnetic force, either during assembly or later adjustment, the magnets 90 and 92 may become dislocated from their bores.

The bore for the second magnet 92 may extend through the second coupling body 64 to an opening 84 in a separate surface. Alternatively, an additional bore having a different diameter may extend from the bottom of the second magnet bore to the opening 84 in the separate surface. In either configuration, a set screw (not visible) is disposed in the second bore or the additional bore so that the set screw end is disposed against the end of the second magnet 92 that is remote to the gap. Threads on the set screw engage threads in the bore (or the additional bore). The set screw can be driven further into the bore toward the gap to increase the magnetic force between the magnets 90 and 92 and thereby increase the preload on the cylindrical elements. Conversely, the set screw can be adjusted to move away from the gap to thereby increase the separation between the magnets 90 and 92 and decrease the magnetic force and preload. In an alternative embodiment, the set screw can be provided instead in the first coupling body 62.

In various embodiments described above, the cylindrical elements are objects having a cylindrical surface, such as dowel pins. In certain alternative embodiments, each cylindrical element comprises a bearing that allows for rotation of a cylindrical surface about its corresponding axis. In such embodiments, unwanted frictional forces are substantially prevented from being transferred across the rotary coupling due to the rolling of the bearings. Such embodiments may be preferable in implementations where further mechanical motion noise reduction is required and where the mass and size of the bearings are not prohibitive.

While various examples have been shown and described, the description is intended to be exemplary, rather than limiting and it should be understood by those of ordinary skill in the art that various changes in form and detail may be made therein without departing from the scope of the invention as recited in the accompanying claims.

What is claimed is:

1. A rotary coupling comprising:
   a first coupling body having a first rotation axis;
   a second coupling body disposed adjacent to the first coupling body and having a second rotation axis that is parallel to the first rotation axis, wherein the first coupling body and the second coupling body are separated from each other;
   a first cylindrical element disposed on the first coupling body and having a first cylinder axis;
   a second cylindrical element disposed on the second coupling body and adjacent to the first cylindrical element, the second cylindrical element having a second cylinder axis that is perpendicular to the first cylinder axis;
   a first magnet disposed on the first coupling body and having a pole disposed at the separation; and
   a second magnet disposed on the second coupling body and having a pole disposed across the separation from the pole of the first magnet, wherein the poles of the first and second magnets disposed at the separation have a same magnetic polarity such that a repulsive magnetic force is imparted on each of the first and second coupling bodies to thereby preload the first and second cylindrical elements against each other at a point of contact.

2. The rotary coupling of claim 1 wherein the first cylinder axis is parallel to the first and second rotation axes.

3. The rotary coupling of claim 1 wherein a position of one of the first and second magnets is adjustable to control the separation between the first and second magnets and thereby adjust the magnitude of the repulsive magnetic force.

4. The rotary coupling of claim 3 wherein the first coupling body comprises a screw to adjust a position of the first magnet with respect to the second magnet.

5. The rotary coupling of claim 1 wherein the second rotation axis is coincident with the first rotation axis.

6. The rotary coupling of claim 1 further comprising:
   a first rotary shaft secured to the first coupling body and having a first shaft axis that is coincident with the first rotation axis; and
   a second rotary shaft secured to the second coupling body and having a second shaft axis that is coincident with the second rotation axis.

7. The rotary coupling of claim 6 wherein the first coupling body and the first rotary shaft are formed as a single body.

8. The rotary coupling of claim 7 wherein the second coupling body and the second rotary shaft are formed as a single body.

9. The rotary coupling of claim 6 wherein the first and second coupling bodies each includes a hub portion secured to the first rotary shaft and the second rotary shaft, respectively.

10. The rotary coupling of claim 1 wherein the first cylindrical element comprises a first bearing having a rotation axis coincident with the first cylinder axis and the second cylindrical element comprises a second bearing having a rotation axis coincident with the second cylinder axis.

11. The rotary coupling of claim 6 further comprising a rotary motor coupled to the first rotary shaft.

12. The rotary coupling of claim 6 further comprising a diffraction grating coupled to the second rotary shaft.

13. A rotary coupling comprising:
    a first coupling body having a first rotation axis;
    a second coupling body disposed adjacent to the first coupling body and having a second rotation axis that is parallel to the first rotation axis, wherein the first coupling body and the second coupling body are separated from each other;

a first cylindrical element disposed on the first coupling body and having a first cylinder axis;

a second cylindrical element disposed on the second coupling body and adjacent to the first cylindrical element, the second cylindrical element having a second cylinder axis that is perpendicular to the first cylinder axis; and a preload mechanism disposed on at least one of the first and second coupling bodies wherein a force is imparted to each of the first and second coupling bodies to thereby preload the first and second cylindrical elements against each other at a point of contact.

14. The rotary coupling of claim 13 wherein the preload mechanism comprises:

a first magnet disposed on the first coupling body and having a pole disposed proximate to the second coupling body; and a second magnet disposed on the second coupling body and having a pole disposed proximate to the pole of the first magnet, wherein the poles of the first and second magnets disposed proximate to each other have a same magnetic polarity such that a repulsive magnetic force is imparted on each of the first and second coupling bodies to thereby preload the first and second cylindrical elements against each other at the point of contact.

15. The rotary coupling of claim 13 wherein the preload mechanism comprises an air bearing that provides a flow of gas directed against at least one of the first and second coupling bodies to preload the first and second cylindrical elements against each other at the point of contact.

16. The rotary coupling of claim 13 wherein the second rotation axis is coincident with the first rotation axis.

17. The rotary coupling of claim 13 further comprising:

a first rotary shaft secured to the first coupling body and having a first shaft axis that is coincident with the first rotation axis; and a second rotary shaft secured to the second coupling body and having a second shaft axis that is coincident with the second rotation axis.

18. The rotary coupling of claim 13 wherein the first cylindrical element comprises a first bearing having a rotation axis coincident with the first cylinder axis and the second cylindrical element comprises a second bearing having a rotation axis coincident with the second cylinder axis.

19. The rotary coupling of claim 17 further comprising a rotary motor coupled to the first rotary shaft.

20. The rotary coupling of claim 17 further comprising a diffraction grating coupled to the second rotary shaft.

* * * * *